Aug. 20, 1968   F. J. LOWES, JR   3,397,478
FISHING DEVICE
Filed Oct. 22, 1965

INVENTOR.
Frederick J. Lowes, Jr.

United States Patent Office 3,397,478
Patented Aug. 20, 1968

3,397,478
FISHING DEVICE
Frederick J. Lowes, Jr., 500 Crescent Drive,
Midland, Mich. 48640
Filed Oct. 22, 1965, Ser. No. 501,010
9 Claims. (Cl. 43—42.14)

ABSTRACT OF THE DISCLOSURE

The present invention is a fishing device and more specifically a lure which attracts fish by emitting sonic impulses as it is drawn through the water. The sonic impulses are produced by at least one rotatable member and a helical cam which is raised by the follower and abruptly dropped by the action of the water.

---

This invention relates to a fishing device, and particularly to an artificial fish lure which emits a pulsed vibration when drawn through the water and attracts fish from some distance.

One purpose of the invention is to provide a "sonic" lure which attracts fish by means of a simple mechanical structure which emits a pulsed vibration when drawn through the water.

A second purpose of the invention is to provide a bait which results in more consistent catching of fish by both sportsmen and commercial fishermen.

Another object of this invention is to provide a series of lures and baits for use with spinning, casting, and trolling tackle that will provide a greater probability and hence catching of fish particularly in turbid waters.

Other objectives will be apparent to those skilled in the art from the accompanying drawings and description below. It is understood that the invention is not limited to the specific form thereof and shown herein.

The earliest reference to olfactory perception in fish may be found in the writings of Pliny and Aristotle. Since that time many attempts were made to utilize either sound or silence to abet the catching of fish. It is now well established that fish respond to sound by swimming to the source of the sound vibrations.

A number of available fishing lures utilize sound to attract fish. Some of these devices take the form of blades, scoops, or paddles which operate by splashing the surface of the water or by entrapping air which is carried below the surface and then released as a bubble. This process is accompanied by "sonic" vibrations. Many of these devices have proven quite successful for luring and catching fish, but are limited in their operation to the air-water interface and are quite ineffective when attempting to lure fish at substantial depths.

Another type of device, is a recently developed lure which has incorporated therein, an electronic circuit, a source of power, an oscillator, and a transducer. These devices are usually quite bulky and do not lend themselves to incorporation in a bait. In addition these electronic devices are expensive compared to the simple mechanical device described herein, and require continuing costly upkeep in the form of battery replacement.

The subject invention differs from these previously known devices in that it produces a pulsed vibration continuously as it is drawn through the water, requiring no source of power other than that expended in retrieving the bate. The sonic pulses are emitted at any depth and do not depend on air-water interface for operation. The rate of pulsed vibration production may be controlled by simply changing the pitch of the blade attached to the rotating member or the rate of retrieval. The depth at which the bait runs may be simply controlled by the rate of retrieval and the addition of weights or float elements on the line ahead of the lure.

The sonic fishing device of the subject invention comprises a shaft to which is normally affixed a swivel and a line. The swivel does not have to be a part of the subject invention but should be used therewith to prevent winding up the line in case the rotatable member becomes fouled with aquatic weeds during retrieval.

Mounted behind the swivel are a series of loose, vibratable members such as beads and washers, followed by one or more bladed rotatable members which turn when the lure is drawn through the water. The rotating member has attached thereto or formed integrally therewith, a helical cam cut so that at least one rotatable element is moved forward when it is rotated by the water during retrieval. The helical cam of the rotatable member rides against a cam follower secured to the shaft, a stabilizing element or a counter rotating bladed element. The stabilizing element may, if desired, be shaped and painted to appear as portions of fish, frogs, bugs, and the like. The extreme rearward end of the shaft may be turned to form a barbed hook or terminated in a loop to which a hook may be fitted. It is also desirable to add a camouflaging mass to conceal the hook from the fish when visual contact is made. When the fishing device described herein, is drawn through the water, the bladed rotatable member turns by the action of the water on the blades. This rotary motion cams the bladed rotary element and the loose members, forward by the action of the helical cam on the cam follower attached to the shaft, the stabilizing element or a counter-rotating bladed element. As the cam follower passes the extreme forward travel, the bladed rotary element and the forward mounted loose members are sharply pressed rearward by the action of the water until the cam follower is again in contact with the helical cam associated with the bladed rotary element, emitting a sonic pulse which serves to attract fish.

The fishing device described herein is especially effective in turbid water or where fish must be attracted from distances beyond visual recognition.

Figure 1:
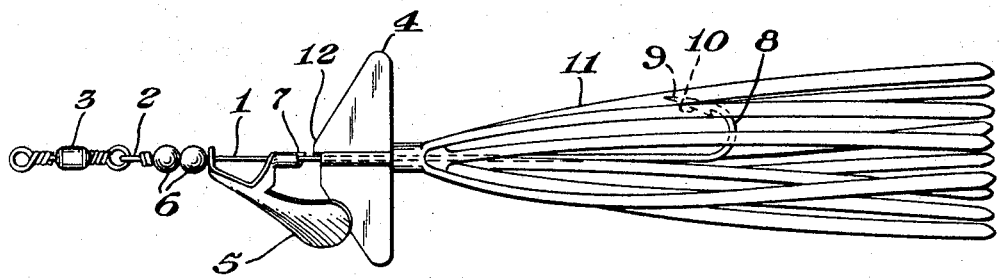
FIG. 1 is a side elevational view of a bait embodying the invention and featuring a single bladed rotary element with an integrally formed helical cam.

Referring to FIGURE 1 of the drawings, the improved bait has a shaft 1, provided with a loop 2, and a swivel 3, for attachment of a line (not shown). Fixedly secured to the shaft 1, is a stabilizing element 4, and freely rotating on shaft 1, is a bladed rotating element 5, and freely sliding beads 6. Bladed rotating element 5, is formed with a helical cam 7, which is essentially concentric with shaft 1. The shaft 1, continues rearward of the stabilizing element 4, and is bent in the form of a hook 8, terminated with a point 9, and having a barb 10. Affixed to the shaft 1, is a camouflaging element 11, made of feathers, fibers, or other filamentatious material, including that described in U.S. Patent 2,111,020. In this figure the cam follower 12, is shown as a projection of the stabilizing element.

Figure 2:
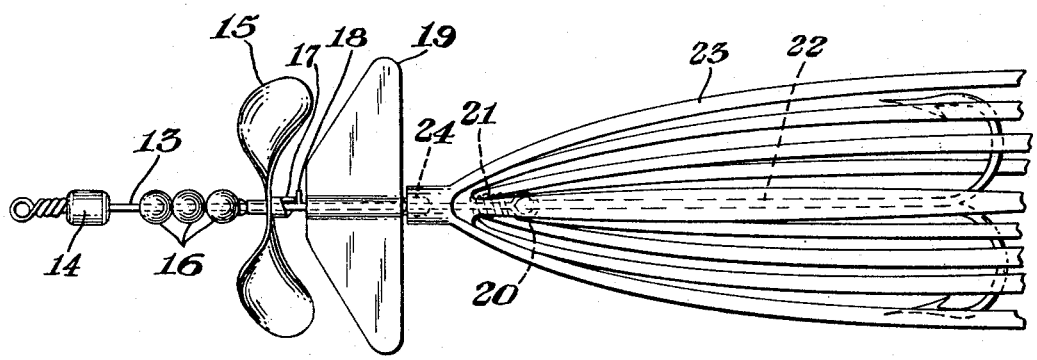
FIGURE 2 is a partial side elevational view of a bait embodying the invention and featuring an integrally formed swivel, a cam follower as a portion of the shaft, a two bladed rotary element, and a changeable hook.

Referring to FIGURE 2, of the drawings, the improved bait has a shaft 13, and an integrally formed swivel 14, fitted with a loop for attaching a line (not shown). Rotatably mounted on shaft 13, is a bladed rotary element 15 which is adapted to rotate about the shaft 13, when the device is drawn through the water. Forward of the bladed rotary element 15, and free to slide on the shaft 13 is mounted loosely fitting beads 16. Attached to the bladed rotary element 15, is a helical cam 17, which rides a cam follower 18, securely attached to or integrally formed on the shaft 13. Also mounted on shaft 13 and affixed thereto is a transversely disposed stabilizing element 19. In this figure the shaft 13, is terminated in a closing loop 20 and a coil spring fastener 21. A treble hook 22 is shown attached to closing loop 20. A camouflaging element 23, as described previously is attached to a projection 24, of stabilizing element 19.

Figures 3, 4:
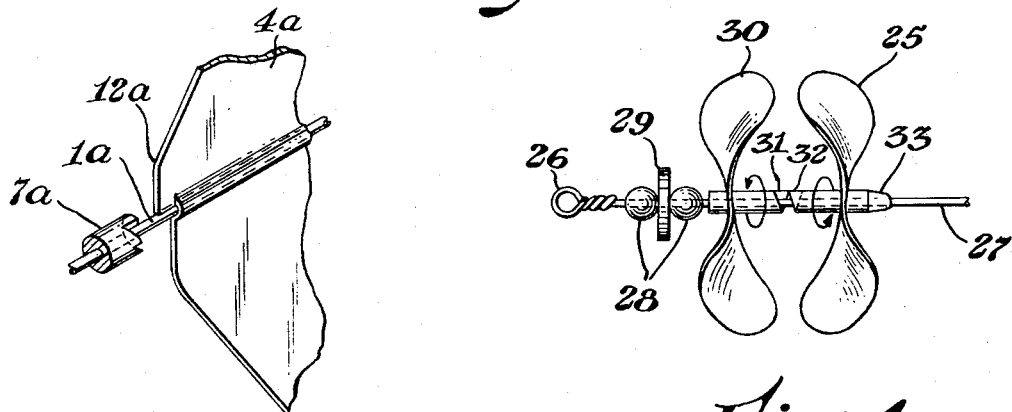
FIGURE 3 is a fragmentary view showing in detail a multiple stepped helical cam and a cam follower as a part of the stabilizing element of FIGURE 1.
FIGURE 4 is a fragmentary view of the invention featuring counter-rotating bladed elements.

Referring to FIGURE 3, there is shown a fragmentary view of the invention which may be considered an alternative to FIGURE 1. FIGURE 3, shows a portion of a shaft 1a, and affixed thereto a portion of the stabilizing element 4a, which has a projecting cam follower 12a, and concentrically disposed a multiple stepped helical cam 7a which is attached to a bladed rotary element (not shown).

Referring to FIGURE 4, there is shown a fragmentary view of the invention featuring a counter-rotating stabilizing element 25. In this case the bait consists of a loop 26 for attachment to a line (not shown). Mounted on the shaft 27 are loosely fitted beads 28 and washers 29, which are free to slide on shaft 27. Also mounted on shaft 27, is a bladed rotary element 30, with an attached helical cam 31. A second counter-rotating bladed rotary element 25 with a complementing helical cam 32, is mounted rearward of bladed rotatable element 30, and retained by a thrust bearing 33. Not shown is the hook and camouflaging elements.

From the foregoing description and accompanying drawings it should be apparent that the herein described fishing device may be used without a hook when the intent is to lure fish into an area for observation or catching with nets, conventional baits and the like. This herein described fishing device may be drawn through the water by attaching it to a boat by means of a line to attract fish to the area where conventional baits are presented, as in the case of marlin, sailfish and tuna. Further the herein described device is useful in fresh waters wherein it may be tethered in a stream, where water is flowing, to attract trout and the like and the area fished with artificial flies and baits. Alternatively, the herein described fishing device may be conventionally cast and retrieved.

Various species of fish respond to different sound frequencies, for example Carcharhinidae and Sphyrnidae are attracted by vibrations in the order of 20 to 60 cycles per second, whereas *Semotilus atromaculatus atromaculatus* (Mitchill) show sonic perception over the range of from 1 to 5750 cycles per second, with the highest perception at about 280 cycles per second, the lowest at 20 cycles per second and above about 2000 cycles per second. It is also known that "white noise" is more effective than single frequencies in gaining the attention of fish and attracting them to the source of the sound. The introduction of a measure of white noise is accomplished in the herein described fishing device through the use of loosely mounted beads and washers ahead of the rotary member so that when the bladed rotary member falls rearward to again engage the cam follower, the loosely mounted beads and washers will set up secondary vibrations which may reinforce the primary frequency but will also yield harmonics and contribute to the desired "white noise."

It is to be understood from the foregoing description and accompanying drawings that bladed rotary elements have pitched blades which serve to turn the rotary element and its associated cam when the fishing device is drawn through the water. The herein described fishing device is unworkable if the blades on the bladed rotary element are set either at 0° or 90° to the direction of travel and should be pitched with the same direction of slope as the associated helical cam, although not necessarily at the same angle.

A number of materials are suitable for the construction of the herein described fishing device. For example, the bladed rotary element and the stabilizing element may be made from sheet metal such as aluminum, brass, stainless steel, ferrous alloys and the like, by standard blanking and forming techniques or alternatively from low melting metals such as aluminum, zinc, cadmium, lead and the like, suitable low melting casting alloys, or organic polymers such as polystyrene, polyamides, polycarbonates, polyepoxides, and the like, poured or injected into a suitable formed mold cavity. The loosely mounted beads and washers, forward of the bladed rotary element are advantageously made from a relatively hard material such as metal, stone, glass, ceramic and the like.

It is desirable to make the bladed rotary element, of the herein described fishing device, from a material which can be easily twisted to establish a change in blade angle so that the lure may be adjusted for different pulse rates at various forward velocities so that it may be simply adjusted to give the desirable results even when used by individuals with widely differing modes and techniques for fishing.

I claim:
1. A fish lure comprising a shaft, one end of said shaft fitted for attachment to a swivel and line, and mounted on said shaft a rotatable member, said rotatable member having one or more pitched radial blades, said pitched radial blades being mounted to rotate said rotatable member normal to its path when said lure is drawn through the water, said rotatable member having a stepped helical cam attached thereto, a second member mounted on said shaft rearward of said rotatable member, said stepped helical cam rotating against said second member whereby said rotatable member will be cammed forward and then abruptly dropped in a rearward direction as said fish lure is drawn through the water.

2. A fish lure as in claim 1, wherein said second member is a transversely disposed stabilizing element fixedly attached to said shaft.

3. A fish lure as in claim 1, wherein said second member is a counter rotating bladed rotary element.

4. A fish lure comprising a shaft, one end of said shaft having formed thereon and integral therewith a swivel, said swivel being fitted with a loop for fastening to a line, the other end of said shaft terminating in a barbed hook, and mounted on said shaft, a rotatable member, said rotatable member having at least one pitched radial blade being mounted to cause said rotatable member to rotate about said shaft when said lure is drawn through the water, said rotatable member having a stepped helical cam attached thereto, a second member mounted on said shaft rearward of said rotatable member, said stepped helical cam rotating against said second member whereby said rotatable member will be cammed forward and abruptly dropped in a rearward direction as said fish lure is drawn through the water.

5. A fish lure as in claim 4, wherein said second member is a transversely disposed stabilizing element fixedly attached to said shaft.

6. A fish lure as in claim 4, wherein said second member is a counter rotating bladed rotary member.

7. A fish lure as in claim 4 wherein said hook is concealed with a filamentous mass.

8. A fish lure as in claim 1 wherein there are loosely mounted and freely sliding members on said shaft forward of said rotatable member.

9. A fish lure as in claim 1 wherein said helical cam is multiple stepped.

(References on following page)

References Cited

UNITED STATES PATENTS

| | | | |
|---|---|---|---|
| 2,518,031 | 8/1950 | Lane | 43—42.31 X |
| 2,610,429 | 9/1952 | Thomas | 43—42.2 X |
| 2,764,835 | 10/1956 | Schaller | 43—42.2 |
| 3,077,698 | 2/1963 | Glass et al. | |
| 3,112,576 | 12/1963 | Tay | 43—42.31 X |

FOREIGN PATENTS 528,021   7/1956   Canada.

SAMUEL KOREN, *Primary Examiner.*

J. H. CZERWONKY, *Assistant Examiner.*